United States Patent Office
3,485,878
Patented Dec. 23, 1969

3,485,878
OXIDATION OF UNSATURATED HYDROCARBONS
Emile Heslan, Pau, France, assignor to Societe Nationale des Petroles d'Aquitaine, Paris, France
No Drawing. Continuation of application Ser. No. 482,883, Aug. 26, 1965. This application June 4, 1968, Ser. No. 739,933
Claims priority, application France, Sept. 15, 1964, 988,163
Int. Cl. C07c 45/10; B01j 11/48
U.S. Cl. 260—604       2 Claims

ABSTRACT OF THE DISCLOSURE

A process is provided for producing essentially acrolein by oxidation of propylene. A gaseous mixture of propylene, oxygen and nitrogen is contacted at a temperature of from 370° to 450° C. with a calcined catalyst of $MoO_3$, $As_2O_5$ and $P_2O_5$ in specified proportions.

---

This application is a continuation of copending applicacation Ser. No. 482,883, filed Aug. 26, 1965, now abandoned.

The present invention concerns the oxidation of unsaturated hydrocarbons, especially olefines, by means of oxygen, on a new catalytic system. The invention particularly concerns this new catalyst. The new process and catalyst are specially useful in the production of unsaturated aldehydes by fixing oxygen on olefines, a very important practical case of which is that of acrolein formed from propylene and air.

Different catalysts have been proposed for effecting some reactions, but it has not been possible, up to the present time, to obtain really attractive selectivity to aldehyde with respect to the olefine used; a selectivity of 85% could not be obtained. Moreover, the catalytic systems, which give the best results, are usually fairly costly, as is the case for example with tellurium containing catalysts known heretofore.

It is known to use, as a catalyst for the oxidation of propylene to acrylic acid, phosphomolybdic acid having added thereto arsenic acid; the reaction generally also gives little amounts of acrolein which forms beside the acrylic acid; however, even when the catalyst has a high content in arsenic as 10% or more, acrolein alone is not obtained with industrially acceptable selectivity; in fact the selectivity acrolein does not reach 80% and it is generally far below this figure with such known catalysts.

The present invention permits, on the contrary, the obtention of high aldehyde selectivity, for example 95% or more, with respect to the weight of olefine transformed. In addition, the catalytic system in accordance with the invention is easy to make, very economic and it allows the oxidation to be carried out at a temperature lower than in conventional methods.

The invention results from the unexpected fact that a catalytic system of oxides

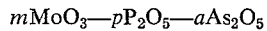
$$mMoO_3 - pP_2O_5 - aAs_2O_5$$

can produce almost exclusively acrolein in the oxidation of propylene with air, if the respective numbers of moles $m$, $p$ and $a$ are comprised between certain specific limits. Thus, as the catalyst may not contain $P_2O_5$ at all, $p$ can be zero, but when it does contain $P_2O_5$, which is preferable, the ratio $p/m$ must be at least 0.1 and preferably 0.2 to 5. In fact, if the relative proportions of $P_2O_5$ and $MoO_3$ are such that $p/m$ is greater than 0 and lower than 0.1 in the catalyst, the oxidation gives mainly acrylic acid with little acrolein. However, surprisingly good yields such as 90% to 97%, in acrolein are obtained when, adequate proportion of $As_2O_5$ being used, $p/m$ is either 0 or 0.1 to 5.

Another important condition is a sufficient proportion of $As_2O_5$: the ratio $a/p$ should exceed 0.1, and it is preferably 0.4 to 2. The ratio $a/m$ should be at least 0.1, and preferably higher than 0.2 and lower than 3.

The content of the catalyst in molybdenum oxide is such that the ratio $m/(p+a)$ is 0.01 to 2.5, while its preferred range is about 0.05 to 0.5. The catalyst according to the invention is particularly active and gives outstanding selectivities to acrolein when it contains 0.5 to 5 moles $P_2O_5$ and 0.3 to 3 moles $As_2O_5$ per mole $MoO_3$.

The new process in accordance with the invention consists in oxidising the olefine by means of oxygen diluted more or less with nitrogen, in the presence of a catalytic mass containing together oxides of arsenic and of molybdenum, and preferably also of phosphorus, with a maximum valency of each of these elements.

The procedure of the invention comprises oxidation by means of air at temperatures of the order of 350° to 500° C., especially towards 370–450° C., while the oxide which constitute the catalyst are in general fixed on a conventional support.

Excellent results are obtained when the system comprises of three above mentioned oxides in the form of a combination of the type phospho-arsenate of molybdenum.

The new catalyst can have as its support any material the use of which for such a purpose is known, especially silica, alumina or a material deriving therefrom, for instance absorbant alumina, bauxite, kaolin, pumice or others. Very good results are obtained with supports of silica gel.

A very practical method of operation, for preparing a catalyst in accordance with the invention, consists of adding the support to an aqueous solution of the three oxides, or to impregnate it with such a solution, to dry the mixture thus formed and subsequently to calcinate it preferably at a temperature higher than that at which the catalyst functions. Calcination temperatures in the region of 500° C., for example 450° to 550° C., are generally suitable. There is thus obtained a porous mass, containing preferably 95% to 50% by weight of support material and 5% to 50% of a ternary system $P_2O_5$—$As_2O_5$—$MoO_3$ ready for use.

In accordance with a particular feature of the invention, the catalytic system can contain, in addition to its three principal oxides, another element of the group V of the Periodic Table, to which the phosphorus and arsenic belong. Thus a catalyst in accordance with this particular feature contains vanadium under the form of one or several of the oxides of this element. If $V_2O_5$ is used its dissolution is preferably effected by the addition of a reducing agent which leads to the formation of a vanadium salt which is more soluble.

In the application of a catalyst in accordance with the invention of the oxidation of propylene into acrolein, the contact time of the mixture of hydrocarbon and oxygen with the catalytic mass can vary at will, but it is preferable that it is of the order of 0.5 to 15 seconds, or better still of 1 to 5 seconds for temperatures of 400° to 450° C.

In this manufacture of acrolein, the mixture or propylene and air can obtain a proportion of air such that the oxygen is in excess with respect to the hydrocarbon. Operation can be especially effected with, for example, excesses of oxygen from 10% to 100% over the stoichiometric proportion of oxygen. However, for excesses up to about 50% it is necessary to adequately control the content in water vapor in the gaseous mixture, to avoid producing an explosive system; this system can also be avoided by any other known means, in particular by the use of an apparatus employing the catalyst under the form of a fluidised bed, in which the explosion is not to be feared.

Preferably, the excess of oxygen, with respect to that which is theoretically necessary, is of 20% to 40%.

On the other hand, it is possible to work with a stoichiometric mixture in so far as the propylene and oxygen is concerned, or else with an excess of propylene; in this latter case, it is better, for economic reasons, not to exceed and excess of 20% of hydrocarbon.

EXAMPLE 1

After having dissolved 4.7 g. of ortho-arsenic acid in 6.6 g. phosphoric acid, there is added to the solution obtained 1.88 g. of phosphomolybdic acid. The volume of the solution is made up to 30 ml. by the addition of distilled water. 25 g. of macroporous silica gel are then impregnated with this solution, after which the gel is dried at 140° C. for 5 hours; it is then calcinated at 520° C. for 12 hours. The calcinated catalyst, thus obtained, presents sensibly the composition $MoO_3.3.4P_2O_5.1.55As_2O_5$, abstract made from the silica; it is tested in a stainless steel tube 12 mm. in diameter, into which there is introduced 10 ml. of the catalytic mass. The reactor tube is maintained at 430° C., in a salt bath, while there is passed thereinto a gaseous current, comprised of a mixture of 71 volumes of air (being 17.7 of oxygen), 14 volumes of propylene and 15 vol. of steam.

The gaseous supply is 11.3 litres per hour, expressed in litres at 0° C. at 760 mm. Hg pressure, which corresponds to a contact time of 1.25 seconds between the gas and the catalyst.

In these conditions, 14% of the propylene entering is transformed into acrolein at each pass of the catalyst, while the untransformed fraction is re-cycled. The propylene used is converted into acrolein with a selectivity of 93%.

EXAMPLE 2

The catalytic mass is prepared in the same manner as for Example 1 from 3.76 g. for phosphomolybdic acid, 4.7 g. arsenic acid and 6.6 phosphoric acid, that is to say with a tenure in $MoO_3$ double that of the preceding example. The proportions of active oxides present are about: $2MoO_3.3.45P_2O_5.1.55As_2O_5$. At 420° C., all the other test conditions being the same as above, the acrolein is obtained with a selectivity of 95% with respect to the propylene transformed; per pass 25% propylene introduced is converted into this ahdehyde.

EXAMPLE 3

In the composition of the catalyst in accordance with Example 1, the content in Mo is quadrupled, by replacing the 1.88 g. of phosphomolybdic acid by 7.52 g., the quantities of the other components being unchanged. There is approximately $4MoO_3.3.7P_2O_5.1.55As_2O_5$. The testing of the catalyst takes place in the same conditions as above except that the temperature is 426° C. The acrolein is then obtained with a selectivity of 94% with respect to the propylene having reacted, the rate of transformation of the propylene being 33%; the remaining propylene is recycled in a new pass over the catalyst.

EXAMPLE 4

The catalyst of the preceding example is modified by the replacement of a part of the $As_2O_5$ by $V_2O_5$. For this, to 40 ml. of water, there is added 1.21 g. of $V_2O_5$, 2.51 g. of phosphomolybdic acid, 6.16 g. of phosphoric acid and 3.07 g. arsenic acid. This is brought to the boil and there is added oxalic acid in small dosages, until the vanadium anhydride is completely dissolved. The composition is:

$$2MoO_3.3.75P_2O_5.1.22As_2O_5.0.9V_2O_5$$

The solution obtained is used for impregnating 30 g. of macroporous silica gel. After drying, the impregnated gel is calcinated at 500° C. for 4 hours.

The catalytic mass, thus formed, is tested at 404° C., the other operational conditions being the same as in the preceding examples.

The acrolein is thus produced with a selectivity of 81% with respect to the propylene, whilst the conversion of this reaches 21%.

EXAMPLE 5

To the preparation of catalyst in accordance with the technique of Example 1, there has been used 3.76 g. of phosphomolybdic acid, 4.7 g. of arsenic acid and 4 g. of phosphoric acid, which leads to a composition in the region of $2MoO_3.2.1P_2O_5.1.55As_2O_5$, the atomic ratio $Mo/(As+P)$ being 0.274 and $As/P=0.74$. The quantity of silica gel was still 25 g. Tested at 400° C., this catalyst gave selectivity to acrolein with respect to propylene used selectivity of 94% for a rate of conversion of 36%.

EXAMPLE 6

In the mixture of Example 5 the phosphoric acid has been omitted, arriving thus at the binary catalytic system $2MoO_3.1.55As_2O_5$. In the same conditions as above, the selectivity was 95%, but the conversion only 8%, which shows the beneficial effect of the presence of $P_2O_5$ in the catalyst.

EXAMPLE 7

The catalyst was prepared as in Examples 1 to 3 and 5, but in using 11.3 g. of arsenic acid for 4 g. of phosphoric acid and 3.76 g. of phosphomolybdic acid with 25 g. of silica gel. The catalytic system obtained being thus richer in As than in the preceding examples, the proportions of active oxides were about:

$$2MoO_3.2.1P_2O_5.3.75As_2O_5$$

The oxidation of the propylene at 400° C., on this catalyst when calcinated, in the same conditions as previously, gave a selectivity of 97% and a rate of conversion of 42% which constitutes a great improvement in comparison with the other examples.

EXAMPLE 8

The catalyst was prepared as in Examples 1 to 3 and 5, but using 9 g. phosphomolydic acid, 0.17 g. arsenic acid and 1 g. silica gel. Thus the proportions in moles of active oxides were:

$$2MoO_3.0.1P_2O_5.0.025As_2O_5$$

The oxidation of propylene at 420° C., carried out as in the above examples, lead to a selectivity to acrolein selectivity of 36% and to a conversion of 41%.

EXAMPLE 9

To a mixture of phosphomolybdic and arsenic acids as that of Example 5 there was added only 0.31 g. of phosphoric acid, in order to have the molar proportions $$2MoO_3.0.17P_2O_5.1.55As_2O_5$$

After operations and test as in Example 5, a selectivity of 73% in acrolein and a conversion of 23% of propylene were obtained.

I claim:
1. A method for producing essentially acrolein by the oxidation of propylene which comprises contacting a gaseous mixture of propylene, oxygen and nitrogen at a temperature of from 370° to 450° C. with a calcined catalyst comprised of $P_2O_5$, $MoO_3$ and $As_2O_5$, wherein said catalyst contains from 0.8 to 3.4 moles of $P_2O_5$ and from 0.38 to 2 moles of $As_2O_5$ per mole of $MoO_3$ and the ratio of the number of moles of $As_2O_5$ to the number of moles of $P_2O_5$ is in the range of from about 0.4 to 2.
2. A method according to claim 1, wherein the catalyst is supported by alumina or silica which forms 50% to 95% by weight of catalytic material.

References Cited

Merck Index, 5th edition, p. 427 (1940).

LEON ZITVER, Primary Examiner

R. H. LILES, Assistant Examiner

U.S. Cl. X.R.

252—437, 467